United States Patent [19]

Sasagaki et al.

[11] Patent Number: 5,627,623
[45] Date of Patent: May 6, 1997

[54] CAMERA AND METHOD FOR ASSURING PHOTOGRAPHY WITH SELECTED PARAMETER

[75] Inventors: Nobuaki Sasagaki; Takashi Saegusa, both of Kanagawa-ken, Japan

[73] Assignee: Nikon Corporation, Tokyo, Japan

[21] Appl. No.: 378,449

[22] Filed: Jan. 25, 1995

[30] Foreign Application Priority Data

Feb. 4, 1994 [JP] Japan .................................. 6-013027

[51] Int. Cl.⁶ .................. G03B 17/18; G03B 17/00; G03B 7/00
[52] U.S. Cl. .................................... 396/299; 396/292
[58] Field of Search ........................ 354/474, 412, 354/289.12

[56] References Cited

U.S. PATENT DOCUMENTS

| | | | |
|---|---|---|---|
| 4,387,977 | 6/1983 | Uchidoi et al. | 354/60 |
| 4,662,736 | 5/1987 | Taniguchi et al. | 354/412 |
| 4,958,184 | 9/1990 | Izumi et al. | 354/474 |
| 4,974,011 | 11/1990 | Azuma et al. | 354/412 |
| 4,990,944 | 2/1991 | Yamamoto et al. | 354/289.12 |
| 5,150,147 | 9/1992 | Kobayshi et al. | 354/412 |
| 5,162,833 | 11/1992 | Taka | 354/289.12 |
| 5,191,373 | 3/1993 | Nakano . | |
| 5,210,569 | 5/1993 | Harada | 354/474 |
| 5,227,831 | 7/1993 | Miyazaki et al. | 354/412 |
| 5,241,334 | 8/1993 | Kabayashi et al. | 354/289.12 |
| 5,298,936 | 3/1994 | Akitake et al. | 354/289.12 |

FOREIGN PATENT DOCUMENTS

| | | |
|---|---|---|
| 4-81731 | 3/1992 | Japan . |
| 4-81732 | 3/1992 | Japan . |
| 4-81733 | 3/1992 | Japan . |
| 4-81734 | 3/1992 | Japan . |

*Primary Examiner*—Safet Metjahic
*Assistant Examiner*—Michael Dalakis
*Attorney, Agent, or Firm*—Oliff & Berridge

[57] ABSTRACT

A camera includes a memory, a display component, a selector, a controller and a shutter assembly. The memory stores a plurality of preset parameters used to control the camera during a photographic operation. The display component is coupled to the memory and displays a selection of parameters from the stored parameters. The selector is coupled to the display and allows a user to select at least one of the displayed parameters for the photographic operation. The controller is coupled to the memory, the display component and the selector. The controller controls the photographic operation based on either a parameter selected from a display when the selector is operated or a parameter automatically selected by the controller when the selector is not operated. The shutter assembly is coupled to the controller and executes the photographic operation based on the selected parameter.

16 Claims, 11 Drawing Sheets

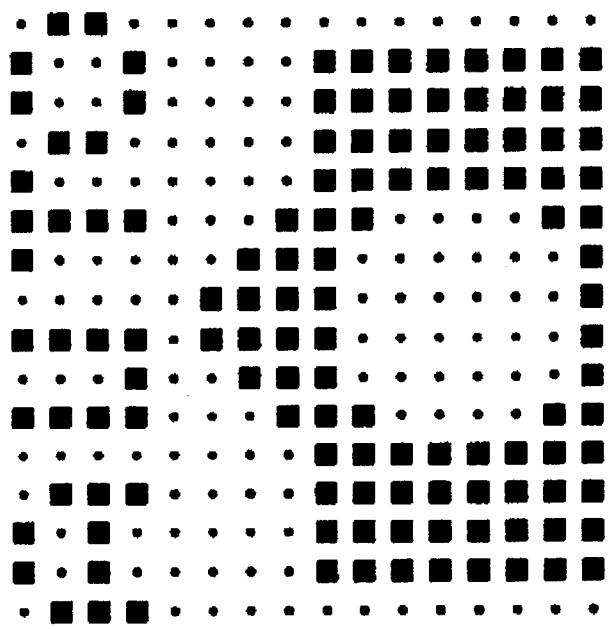
FIG.5b
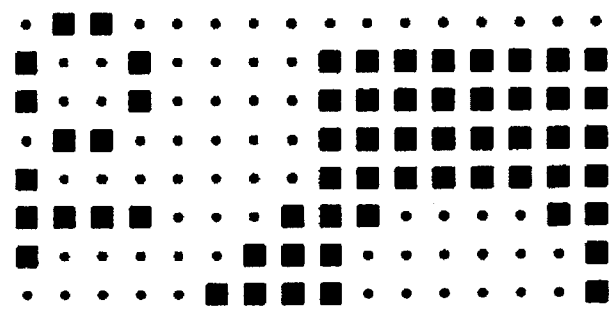
81
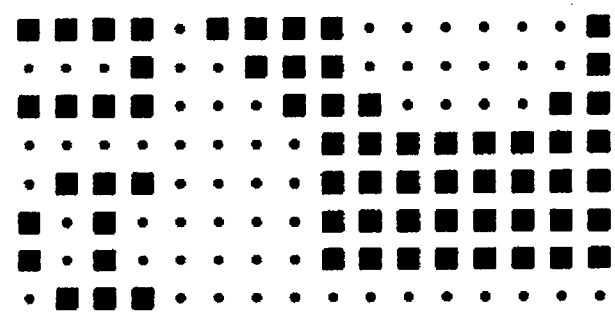
80
FIG.5a

FIG.11

CAMERA AND METHOD FOR ASSURING PHOTOGRAPHY WITH SELECTED PARAMETER

This application is directed to subject matter that is related to subject matter in co-pending U.S. patent application Ser. Nos. 08/378,351 entitled "Display System and Method for a Camera," 08/377,604 entitled "Camera Equipped With Warning Function and Method," 08/377,839 entitled "Camera for Selectively Inputting Operating Parameters and Method," 08/377,838 entitled "Camera Input and Display Device With Timer and Method," 08/377,840 entitled "Camera With Film Sensitivity Setting Function and Method," 08/377,836 entitled "Camera Display System and Method," and 08/377,825 entitled "Camera With Simplified Parameter Selection and Dual Mode Operation and Method of Operation", filed on the same day by the same inventors/ which are all hereby incorporated by reference.

BACKGROUND OF THE INVENTION

1. Field of the Invention

The present invention relates to a camera with selectable parameters, and in particular, to a camera in which photography is performed in accordance with a parameter selected by a user or, if the user does not select a parameter, with a predetermined parameter.

2. Description of Related Art

In recent years, with the advent of computers, the camera has become capable of performing numerous functions. Automatic focusing adjustment (AF) devices and automatic exposure (AE) devices are representative examples of such functions. In addition, various types of monitoring functions, such as detection of film sensitivity setting, detection of the number of frames in film, and detection of camera deflection, have been developed.

As cameras with various types of monitoring systems become more common, the data required by these systems must be supplied to the camera. For example, such data relates to the setting of various types of parameters in terms of automatic exposure, the setting of various types of parameters to adjust the automatic focus, and the display of the monitor data. For that reason, cameras developed in recent years have been equipped with display devices, such as liquid crystal displays.

Japanese Unexamined Utility Model Publication No. Hei 3 - 42141 is one such example. Its technology relates to the display device of a camera that displays picture taking information relative to that camera, the display component being placed on the camera main body. A dot LCD (liquid crystal display device) is used for the display section. This display section is divided into a plurality of areas. The divided display device displays a sub-title of information in each area. The camera is also equipped with a total display device that displays detailed data in the display section described above.

A sub-title information selection device selects one of the pieces of sub-title information being displayed by the divided display device. An image screen switch-over device displays the subordination data of the subtitle information selected to the display section via the total display device described above when one of the pieces of sub-title information is selected. While the photographer watches the sub-title information being displayed, he or she operates the switch until the desired sub-title data is displayed. When the desired sub-title is displayed on one of the divided areas, the operation switch corresponding to the areas is activated to select the sub-title. In this manner, when the sub-title is selected, the subordination data of the sub-title information is displayed on the display section, via the total display device by the image screen switch-over device.

However, there is the problem in the conventional technology in that the corresponding relationship between the operational switch and the display is not clear. Furthermore, while the photographer watches the sub-title information being displayed, it is necessary to operate the switch until the desired sub-title information is displayed, which is time consuming. In addition, with the conventional technology, at the time when the desired subtitle is displayed on one of the divided areas, the operation switch corresponding to each area must be operated to select the sub-title. Therefore, it is necessary to carry out the operation for display and the operation for selection. This complicates the operation and, furthermore, inconveniently requires the operation to be repeated. Especially when complicated selection operations are needed, it is difficult for the photographer not accustomed with the system to accomplish the intended function.

In addition, when the operation is too complicated, the problem may occur that the photographer may lose the present conditions of the camera. In other words, when the operation is repeated many times, the photographer loses the conditions being set at that time. Further, even if the photographer tries to confirm the display, it is not clear what to look for. Furthermore, since the operation itself is too complicated, it is difficult to easily return to the initial display.

Also, a photographer does not always use a different mode, and, on many occasions, the favorite mode of the photographer will remain constant. In such a case, it is desirable that the targeted mode should be selected immediately, without going through a complicated selection operation. In addition, an inexperienced photographer will probably take pictures by entrusting parametric determinations to the camera, without performing complicated operations.

SUMMARY OF THE INVENTION

Accordingly, it is an object of the present invention to provide a camera that is easy for an unfamiliar photographer to use because information relating to the parameters necessary for settings can be readily viewed by the photographer.

It is another object to provide a camera with which a photographic operation (e.g., taking a picture) can be executed even if it is initiated during a parameter selection sequence but before the parameter is selected.

These and other objects are achieved by the camera and method of the present invention. The camera includes a memory, a display component, a selector, a controller and a shutter assembly. The memory stores a plurality of preset parameters used to control the camera during a photographic operation. The display component is coupled to the memory and displays a selection of parameters from the stored parameters. The selector is coupled to the display and allows a user to select at least one of the displayed parameters for the photographic operation. The controller is coupled to the memory, the display component and the selector. The controller controls the photographic operation based on either a parameter selected from a display when the selector is operated or a parameter automatically selected by the controller when the selector is not operated. The shutter assembly is coupled to the controller and executes the photographic operation based on the selected parameter.

In general, the parameters relate to various focus and exposure settings. The camera can also include a power switch coupled to the controller such that when the power switch is operated, the parameter is automatically selected by the controller. In another embodiment, the parameter is automatically selected by the controller when the power switch is switched to the OFF position.

The shutter assembly can include a shutter release. In one embodiment, when the shutter release is being actuated, the parameter is automatically selected by the controller. The controller can include a timer. In one embodiment, when the timer exceeds a predetermined value, the parameter is automatically selected by the controller.

The display component can include a dot matrix display having a plurality of display blocks and the selector can include a plurality of switches, each of the switches being positioned to correspond to one of the display blocks. The display component can display at least a first display in which the plurality of preset parameters available for selection are displayed and at least a second display in which the selected parameter is displayed.

According to one method of performing a photographic operation with the camera of the present invention, the camera stores a plurality of preset parameters used to control the camera during the photographic operation, displays at least one of the stored parameters for selection, selects a parameter for the photographic operation from either a displayed parameter when a user selects a parameter from the display or an automatically selected preset parameter when the user fails to select a parameter, controls the photographic operation with the controller based on the selected parameter, and operates the shutter assembly to execute the photographic operation in accordance with the selected parameter.

In another method, the camera continues the photographic operation after an interruption in the parameter selection sequence occurs. In this method, the camera stores a plurality of preset parameters used to control the camera during the photographic operation, displays at least one of the stored parameters for selection, receives user input through the shutter assembly to initiate the photographic operation, and when an interruption occurs before a parameter is selected with the selector, the controller automatically designates the selected parameter. The photographic operation then continues in accordance with the selected parameter automatically designated by the controller.

BRIEF DESCRIPTION OF THE DRAWINGS

A complete understanding of the present invention may be obtained by reference to the accompanying drawings, when considered in conjunction with the subsequent detailed description thereof, in which:

FIGS. 5a and 5b are explanatory diagrams showing display examples for the dot matrix display section of this invention;

FIG. 11 is an explanatory diagram showing one of the examples of the display character patterns stored in the pattern generator used in this invention.

DETAILED DESCRIPTION OF PREFERRED EMBODIMENTS

Figure 1:
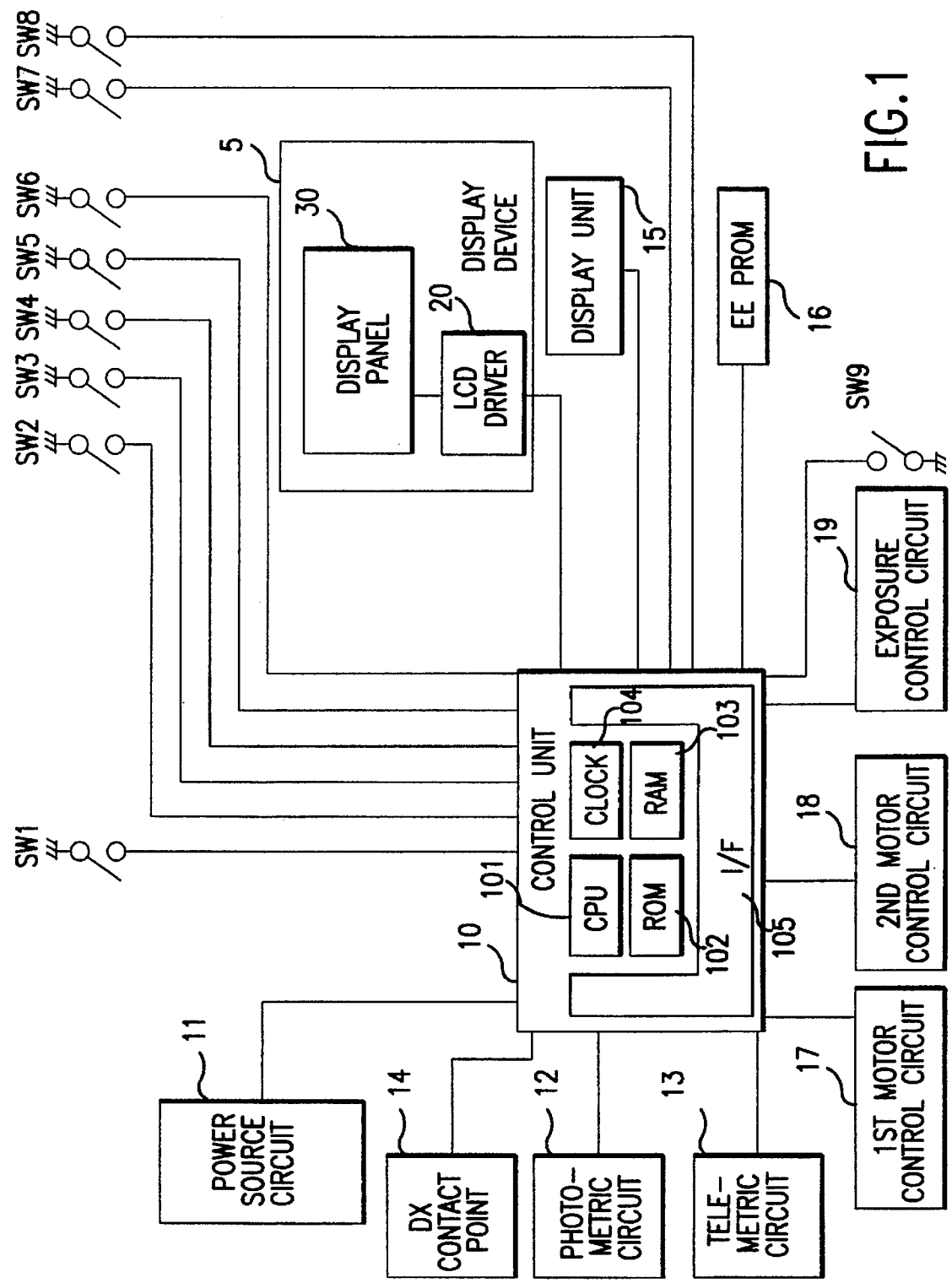
FIG. 1 is a schematic drawing of the structure of the hardware system of one of the embodiments of a camera according to the invention.
Figure 2:
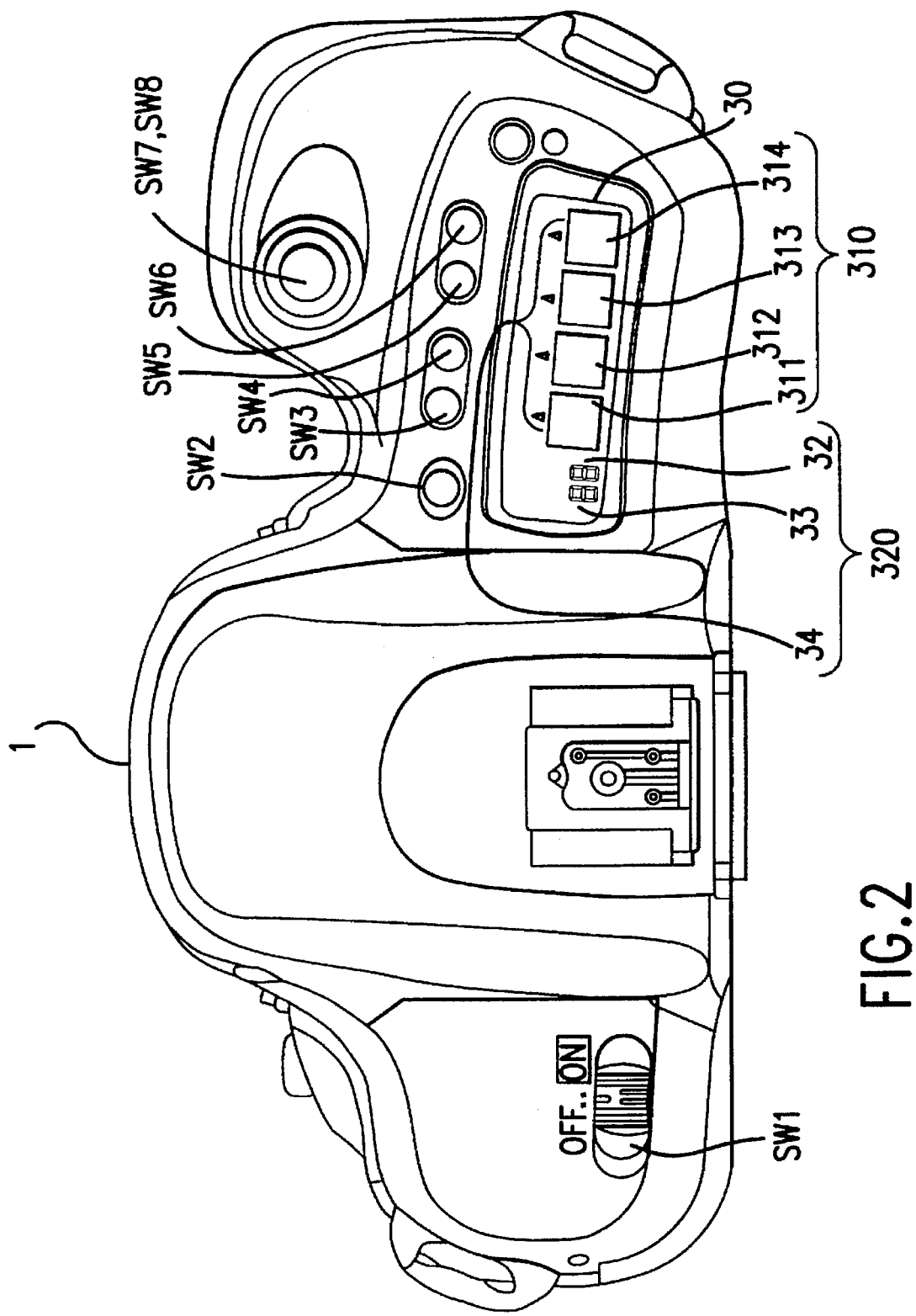
FIG. 2 is a top view of the external appearance of the upper surface body of one of the embodiments of a camera according to this invention.

FIG. 1 shows an example of the hardware system structure of an embodiment of a camera according to the present invention. FIG. 2 shows an example of the external appearance of the upper surface body 1 of an embodiment of a camera according to the present invention. The camera includes the conventional components of a photographic system, such as a lens, a zoom system, a focus system, a mirror assembly, a light sensor, and a film drive assembly, contained within body 1.

The embodiment shown in FIG. 1 is equipped with a display device 5 that accomplishes the display of data for the photographer from the camera side and a control unit (MCU) 10 that controls and oversees the operation of the camera. Control unit 10 is connected to display device 5 as shown in FIG. 1.

Control unit 10 is also connected to a photometric circuit 12 that accomplishes photometry, a telemetric circuit 13 that measures distance, and a DX contact point 14 that reads the film sensitivity. A first motor control circuit 17, a second motor control circuit 18, an exposure control circuit 19, EEPROM 16 (electrically erasable programmable read only memory) that functions as a memory device to store data, and a finder display unit 15 are also connected to control unit 10. Control unit 10 controls and monitors the operations described. It would also be appropriate if desired to install a sensor (not shown in the drawing) to monitor the movement of the camera, which would be coupled to control unit 10 to transmit signals representative of the sensor readings. Additionally, an electric source circuit 11 is coupled to control unit (MCU) 10 to supply electric power to control unit 10 and hence the system.

First motor control circuit 17 is a circuit to control the driving of the motor that drives the lens. In the preferred embodiment, first motor control circuit 17 controls driving of a zoom drive and a focus drive. In addition, second motor drive circuit 18 is a circuit that controls the motor drive to accomplish the mirror up and down drive and the film supply drive. Exposure control circuit 19 is a circuit that controls the aperture, the shutter and adjustment of light.

As seen in FIG. 2, display device 5 is equipped with a display panel 30, installed to the right side section of the upper surface of body 1, for example. An LCD driver 20, which comprises the driving device to accomplish the display drive of display panel 30, is installed in body 1 of the camera. Display panel 30, in this embodiment, is structured using a liquid crystal display panel, wherein the size, layout, location, and placement of which are determined by the shape and location of the display control.

Display panel 30 includes a dot matrix display component 310 and a segment display component 320, as seen in FIG. 2. In dot matrix display component 310, as shown in FIG. 4a, a plurality of display blocks 311, 312, 313 and 314 are placed horizontally. These display blocks 311, 312, 313 and 314 are structured with dot matrix display units 31a through 31h, which accomplish the display with a column width of one half of an em pica, with an "em" being the space occupied by an M in pica-size type. Preferably, each of the half em units 31a through 31h is structured with 16 vertical dots and 8 horizontal dots. In other words, each pair of dot matrix display units (31a and 31b, 31c and 31d, 31e and 31f and 31g and 31h) form a display block 311 through 314, respectively. Each display block 311 through 314 is placed horizontally with a predetermined spacing. In this manner, because a space exists between each display block, the display can be seen easily. Especially when the symbols representing the selected display element are aligned in a row, the space between each display block allows easy recognition and prevents confusion. For example, when the symbol "1" is displayed, the spacing allows the viewer to recognize that the symbol is a single number rather than an element of a larger number.

In this embodiment, electrodes are not installed in the space between the display blocks 311, 312, 313 and 314 of the dot matrix display component 310. However, it is possible to prepare a structure having an electrode positioned in the space between the display blocks. In such a case, it would be possible to show a space between symbols in the display by not activating the dots for the empty space.

Each pair of display units 31a, 31b, for example as shown in FIG. 4b, can be used to make the display of "P" with an em using a 16×16 dot matrix. There are eight 16×8 dot matrixes in the dot matrix display component 310, which are connected to 16 pieces of a common terminal 30a and 8×8=64 pieces of a segment terminal 30b. Each display block is driven by the voltage applied to these terminals 30a and 30b. Since there are 16 pieces of common terminal 30a, the display is generated according to a 1/16 duty cycle.

For purposes of explanation in this embodiment, each display unit 311–314 is structured with a picture element of 16 vertical dots×8 horizontal dots. However, the present invention is not limited to these design specifics. For example, the picture element can have any size m×n. For example, it is possible to make m=24 dots and n=16 dots.

Segment display component 320 is equipped with two seven-segment display components 32 and 33 and an auxiliary display component 34 that functions at least as a display element to display the corresponding relationship between the blocks and switches. Optionally, display component 320 includes an exposure adjustment display component that lights when the exposure adjustment is made, a memory mode display component that lights when the function is set to move momentarily to the picture taking mode stored in the memory, and a mode display component that displays the present mode.

Figure 4:
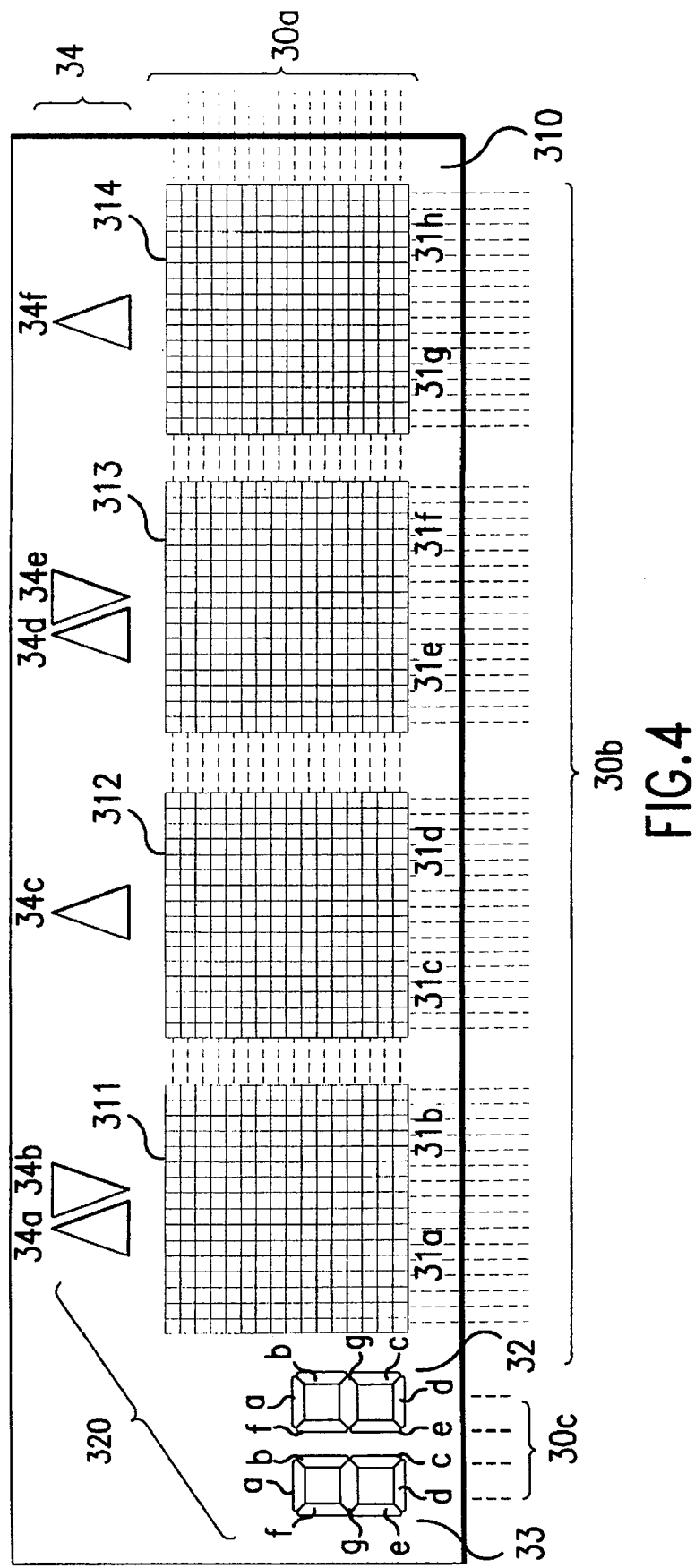
FIG. 4 is an explanatory diagram showing one of the examples of the display panel structure used in this invention.

As seen in FIG. 4, each seven-segment display component 32 and 33 is composed of seven segments, a through g. In addition, the display components can also be structured with more than seven segments. For example, each single segment can be configured as a double segment or additional cross segments can be added.

Auxiliary display component 34 is structured with six pieces of triangular segments 34a through 34f. The bases of triangular segments 34a, 34c, 34d and 34f are placed facing dot matrix display component 310 and in correspondence with the four em display blocks 311 through 314. In addition, triangular segments 34b and 34e are placed in the reverse direction to triangular segments 34a, 34c, 34d and 34f, in correspondence with display blocks 311 and 313 and adjoining triangular segments 34a and 34d.

Segment display component 320 is composed of a total of 20 segments, as seen in FIG. 4. Terminal 30a is used in common with dot matrix display component 310 and is driven with a 1/16 duty cycle. Therefore, only two segment terminals are required. However, it is also appropriate to slightly increase the number of terminals, taking the degree of freedom in wiring into consideration. In this embodiment, for example, as shown in Table 1 below, it is appropriate to use four segment terminals 30c (SEG 64 through. SEG 66)., using 8 pieces of COM terminal (COM 0–7).

TABLE 1

|       | COM7 | COM6 | COM5 | COM4 | COM3 | COM2 | COM1 | COM0 |
|-------|------|------|------|------|------|------|------|------|
| SEG64 |      | 32g  | 32f  | 32e  | 32d  | 32c  | 32b  | 32a  |
| SEG65 |      | 33g  | 33f  | 33e  | 33d  | 33c  | 33b  | 33a  |
| SEG66 |      |      | 34f  | 34e  | 34d  | 34c  | 34b  | 34a  |

As described above, with this embodiment, it is assumed that the segment display component differs only in shape from the dot matrix display component. In other words, the size of one of the segments differs, yet it is the same power value as the dot matrix display. In this manner, when the common drive is used, it is effective in that the circuit can be simplified. In addition, when the common segment display component is separated from the common dot matrix component and they are driven independently, the characteristics of the segment display component can be controlled separately from the dot matrix display. As a result, in terms of duty cycle, the characteristics can be improved by that amount. However, there is no advantage to such improvement unless the characteristics of the display component as a whole are improved, even if the characteristics in the individual segment display component are improved. Furthermore, it is desirable to use the common drive method, as in this embodiment, considering the fact that if the characteristics in the dot matrix display component are improved, there is no need for further improvement.

When LCD driver 20 receives the signal from MCU 10, the dot display can be created by the dot matrix display component 310 by the character generator in the internal section. At the same time, the segment display can be made in accordance with the signal from MCU 10 to segment display component 320. In addition, a finder LCD 15 is driven directly by a special output port for LCD of MCU 10.

Figure 3:
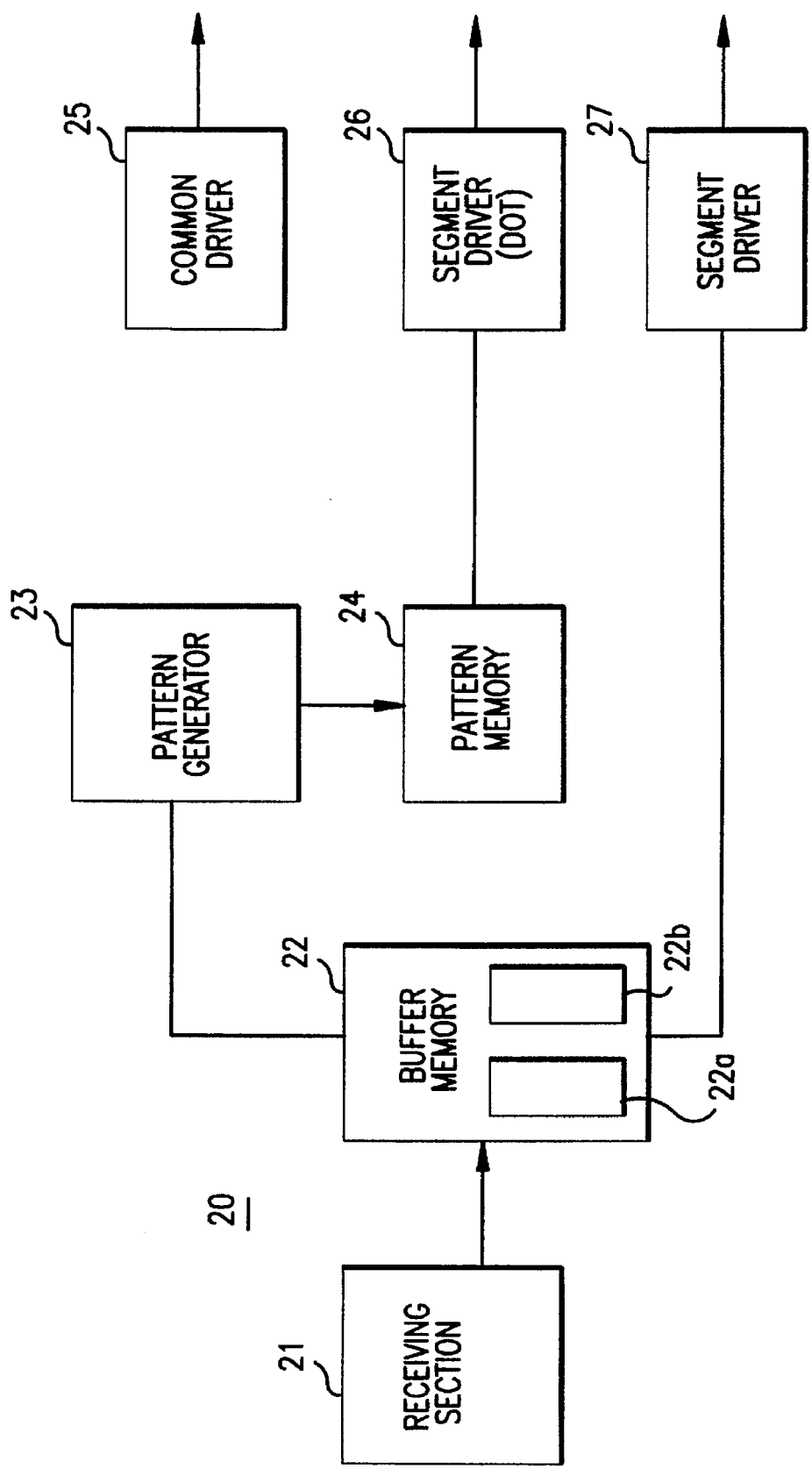
FIG. 3 is a block diagram showing one of the examples of the liquid crystal driver structure used in one of the embodiments according to this invention.

FIG. 3 shows one example of the structure of LCD driver 20. In the figure, LCD driver 20 is equipped with a receiving component 21 that receives a signal from control unit 10, a buffer memory 22 that stores the received data temporarily, a pattern generator 23 that reads the command of data being stored in buffer memory 22 and creates the symbol pattern indicated by the command, a pattern memory 24 that stores the created pattern, a common driver 25 that drives dot matrix display component 310 and segment display component 320 of display panel 30 with the common duty cycle, a segment driver (column driver) 26 that reads the pattern being stored in pattern memory 24 and displays it with dots, and a segment driver 27 that reads the segment display data from the data stored in buffer memory 22 and drives the corresponding segment.

Buffer memory 22 is equipped with capacity for storing the 12 byte data. The memory is divided into a dot data memory block 22a, which stores D-0 through D-7 for dot matrix display component 310, and a segment data memory block 22b, which stores D-8 through D-11 for segment display component 320, among the command columns D-0 through D-11, which will be explained later.

Command driver 25 drives the common signal wire of dot matrix display component 310 and segment display component 320 via common terminal 30a described previously. Segment driver 26 drives dot matrix display component 310 via segment terminal 30b. Segment driver 27 drives segment display component 320 via segment terminal 30c.

Figure 11:
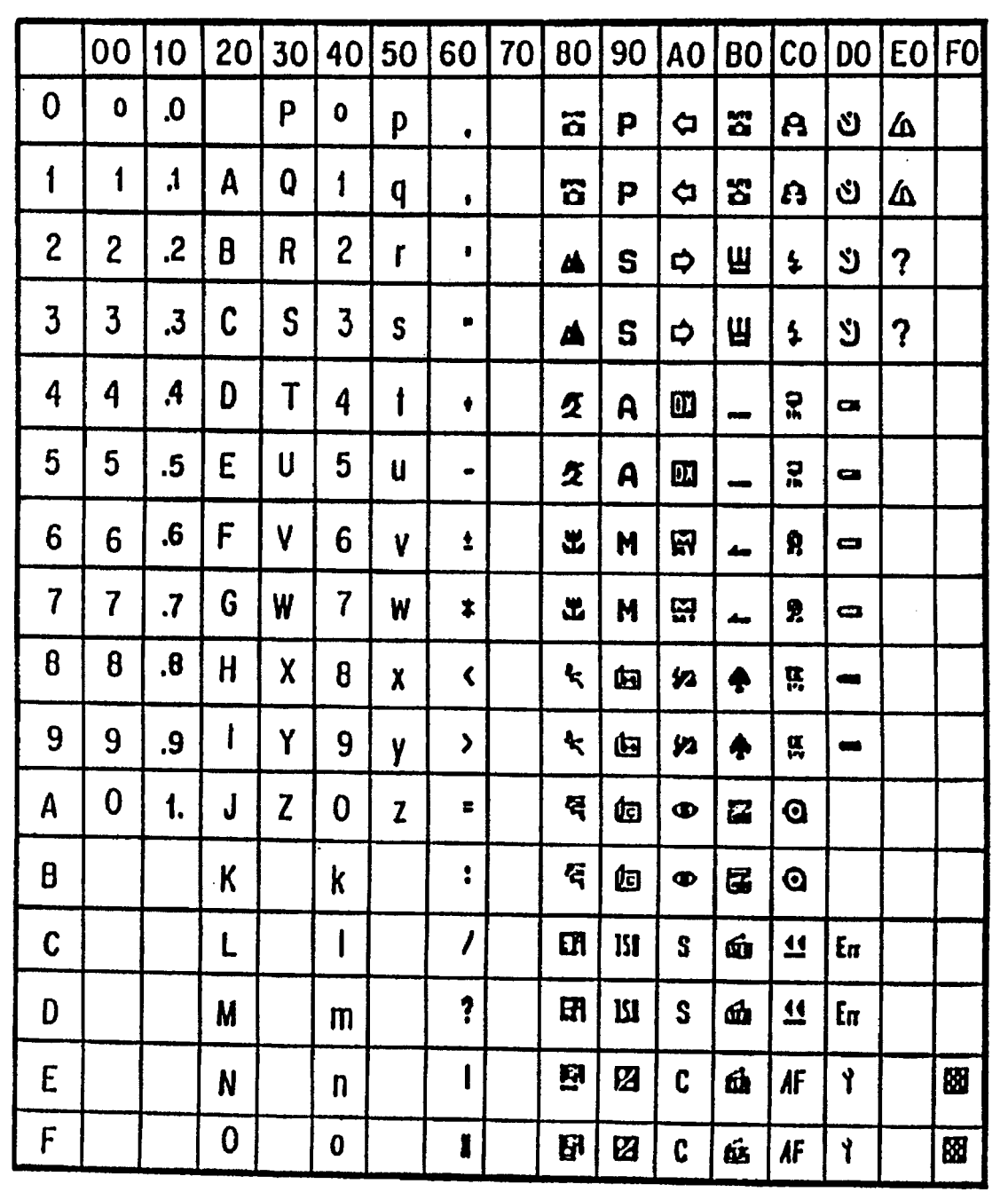

Pattern generator 23 is structured with a memory and a reading drive circuit (neither are shown in the drawing). The memory stores the display pattern (character pattern) as shown in FIG. 11 in a 16×16 matrix. These patterns prepare the symbols displaying the contents of the selected branch and the symbols displaying the contents of warning, etc. In FIG. 11, the horizontal column corresponds to the superordination address and the vertical column corresponds to the subordination address.

In addition, in FIG. 11 the em-size display patterns after address "80" are such that the same pattern is linked to two addresses in order to make the explanation in the present embodiment easier to understand. In actuality, as shown in FIG. 5a, the left half of the pattern is provided in the first of the two linked patterns, and the right half is provided in the second pattern. Accordingly, a single display pattern is comprised by combining the two, as shown in FIG. 5b. In FIGS. 5a and 5b, the areas indicated by "." are in actuality the blank areas, but such are indicated here by "*" in order to make the arrangement of dots easier to understand.

Dot patterns which indicate numbers and letters are also included in FIG. 11, although such are not used in the present embodiment. Accordingly, it is possible to display such by indicating their addresses. In this way, by storing patterns that are not used, the pattern generator can be standardized. In other cameras, numbers and letters might be used, so the present configuration can also be used in these cameras, thereby holding costs down.

Referring back to FIG. 1, control unit 10 is equipped with a central process unit (CPU) 101, which accomplishes various types of processes such as monitoring and control of the camera, ROM (read on memory) 102, which stores programs and various types of constants in memory, RAM (random access memory) 103, which is used for storing various types of data showing the present condition of the camera and is used as a work space for calculations, clock circuit 104, and interface circuit (I/F) 105, which accomplishes the input and output processes with the other circuits and components in the camera. A program is stored in ROM 102 that executes the commands indicated in the flow charts.

In addition, central process unit 101 includes a timer function. In this embodiment, the timer is used for timer movement, which will be explained later.

The switches SW1 through SW9 are connected to control unit 10 via the input port of interface circuit 105. Among these, switches SW1 through SW8 are placed on the upper surface of body 1 of the camera as shown in FIG. 2. SW1 is the power source switch. SW2 is the switch corresponding to the left-most position of the LCD display section as seen in FIG. 2 and functions as a change operation component. In actuality, SW2 functions as a menu button to bring up the menu. SW3 through SW6 are the switches corresponding to the four display blocks 311 through 314 previously described, and form the first switch group. The second switch assembly is formed of menu button SW2. The release button includes both SW7 and SW8. SW7, which is the autofocus switch, operates with the first stroke of the release button and is a half-depression switch. SW8 operates with the second stroke of the release button and is the shutter release switch. SW9 is the back cover switch that-indicates whether the back cover of the camera is open or closed.

As described, each display block 311 through 314 of dot matrix display section 310 is aligned in a horizontal manner, as shown in FIG. 2 and FIG. 4. For that reason, the switches SW3, SW4, SW5 and SW6 of the first switch group are placed parallel to the display blocks 311 through 314 in columns. In addition, switches SW3, SW4, SW5 and SW6 are each placed to correspond with a respective display block. The symbols for the selected branches displayed on display blocks 311 through 314 correspond with switches SW3, SW4, SW5 and SW6 by the operation of control unit 10.

The triangle segments of the auxiliary display section 34 described previously function as display elements that optically indicate the corresponding relationship between the symbols of the selected branches displayed on display blocks 311 through 314 and switches SW3, SW4, SW5 and SW6. For that reason, in this embodiment, auxiliary display section 34, as shown in FIG. 2, is placed between display blocks 311 through 314 and switches SW3, SW4, SW5 and SW6 of the first switch group.

In the positional relationship described above, the triangle segments of auxiliary display section 34 function as a graphic pattern suggesting direction. In other words, glancing at the symbols being displayed on display blocks 311 through 314, the photographer will select one of the switches above. At that time, if the triangle segment of auxiliary display section 34 is viewed as an arrow, it is possible to make the photographer understand intuitively that the switch located in the direction pointed to by the top of the triangle segment should be depressed.

A state register M0 and a mode register M1 are installed in RAM 103 in control unit 10. The memory contents of these registers is determined as shown in Table 2 and Table 3.

TABLE 2

| M0 | State register |
| --- | --- |
| 0 | Non-selection state (Image being implemented) |
| 1 | Mode selection state (Selected image) |

In other words, the state register M0 sets the flag indicating that the display screen being displayed on dot matrix display section 310 is the first display indicating the selected branch, that is, the display screen of the selection possible mode (selection state display screen). Alternatively, the flag is set indicating that the display screen is the second display indicating the selected mode, that is, the display screen non-selection mode (selection being confirmed). In the case of former, "1" is set and in the case of latter, "0" is set.

TABLE 3

| M1 | Binary | Mode Register |
| --- | --- | --- |
| 0 | 0 0 | Automatic mode |
| 1 | 0 1 | Scenery mode |
| 2 | 1 0 | Portrait mode |
| 3 | 1 1 | Close up mode |

In the mode register M1, one of the four modes shown in Table 3 can be selectively set to the mode register. These modes are represented in binary numerals and include the automatic mode, scenery mode, portrait mode and close-up mode. These four modes are all program exposure modes. The automatic mode is the program that combines the most generally used shutter speed and aperture value. The scenery mode, portrait mode and the close up mode are program modes that select the combination of the shutter speed and the aperture value that is most effective for the object to be photographed. The selection can be accomplished at the first display. These selections are equivalent to data being input into the camera, or in more concrete terms, the input parameters designating the operating conditions of the camera.

Furthermore, control unit 10 structures the command column on RAM 103, which accomplishes the serial transfer to LCD driver 20, an example of which is shown in Table 4. As shown in Table 4, the command column is structured with 11 bytes from D0 to D10. Each byte from D0 to D10 is serially transferred in that order. Each of the positions stationarily corresponds to display units 31a through 31h of dot matrix display section 310 and segments 32, 33 and 34. The data for display of each display section are stored in each byte.

TABLE 4

| MCU Data | Command | Contents |
| --- | --- | --- |
| D0 | 1 byte | Dot matrix 31a data for display |
| D1 | 2 | Dot matrix 31b data for display |
| D2 | 3 | Dot matrix 31c data for display |
| D3 | 4 | Dot matrix 31d data for display |
| D4 | 5 | Dot matrix 31e data for display |
| D5 | 6 | Dot matrix 31f data for display |
| D6 | 7 | Dot matrix 31g data for display |
| D7 | 8 | Dot matrix 31h data for display |
| D8 | 9 | Segment display data for 32 |
| D9 | 10 | Segment display data for 33 |
| D10 | 11 | Segment display data for 32 |

In the case of data for the dot matrix display section from D0 through D7, D0 is described for the display unit 31a, D1 is described for the display unit 31b and so on. In the manner above, the memory address of the pattern corresponding to pattern generator 23 is described.

In addition, in the case of data for segment display from D8 through D11, the segment to be lighted in each corresponding segment display sections 32, 33 and 34, is described by the data designated by the coordinated bit. In other words, D8 accomplishes the lighting of the segment a through g of segment display section 32 using the bits 0 through 6. D9 accomplishes the lighting of the segments a through g of segment display section 33 using the bits 0 through 6. D10 accomplishes the lighting of the segments a through f of auxiliary display section 34 using the bits 0 through 5.

In the command example shown in Table 4, block display sections 311 through 314 are driven with a half em display unit. However, the present invention is not limited to the above. It is also possible to indicate the display pattern with an em size display unit.

For example, as shown in Table 5, it is possible to make the command row of 7 bytes from D0 through D6. In the example in Table 5, the character pattern address to be displayed on display block 314 with D0, the character pattern address to be displayed on display block 313 with D1, the character pattern address to be displayed on display block 312 with D2, and the character pattern address to be displayed on display block 311 with D3 are transferred. In addition, the data with D4 corresponding to the bit to be lighted among triangle segments 34a, 34c, 34d and 34f of auxiliary display section 34, the data with D5 corresponding to the bit to be lighted among triangle segments 34a, 34c, 34d, and 34-f, and the data with D6 showing the numerical values 0 through 99 indicating the number of film frames and the final segment to accomplish the display of E indicating that the frame is the final one, are transferred.

TABLE 5

| Command | Contents | Display |
| --- | --- | --- |
| D0 | Dot display right-most | Dot display by Table 4 |
| D1 | Dot display central right | Dot display by Table 4 |
| D2 | Dot display central left | Dot display by Table 4 |
| D3 | Dot display left-most | Dot display by Table 4 |
| D4 | Arrow display | Every bit display |
| D5 | Flashing flag | Every bit flashing |
| D6 | Film frame no. display | 0 through 99, E |

In this example, the character pattern is displayed with a total em unit. Therefore, pattern generator 23 reads two pieces of character data in half em units comprising a pair based on the transferred data, and this should be displayed on one of the display blocks. In addition, the character generator stores the memory only relating to the necessary pattern. It is therefore possible to reduce the memory capacity. It is also possible to store using a total em, instead of a half em. The address can be reduced by storing the memory with a total em unit.

Table 6 is one of the examples described above. In other words, the blank can be stored in address 0, the icon of a camera indicating the automatic mode in address 80, the icon of mountain indicating the scenery mode in address 81, the icon of a profile indicating the portrait mode in address 82, and the icon of a flower indicating the close up mode in address 83. These can be output by designating the address. In this example, only the icons from 81 through 83 are shown. However, it is also possible to store other graphic patterns. It is also possible to reduce the memory capacity by reducing the number of icons.

TABLE 6

| Address | Character generator |
| --- | --- |
| 0 | Blank |
| 80 | Automatic mode display |

TABLE 6-continued

| Address | Character generator |
| --- | --- |
| 81 | Scenery mode display |
| 82 | Portrait mode display |
| 83 | Close up mode display |

Figure 8:
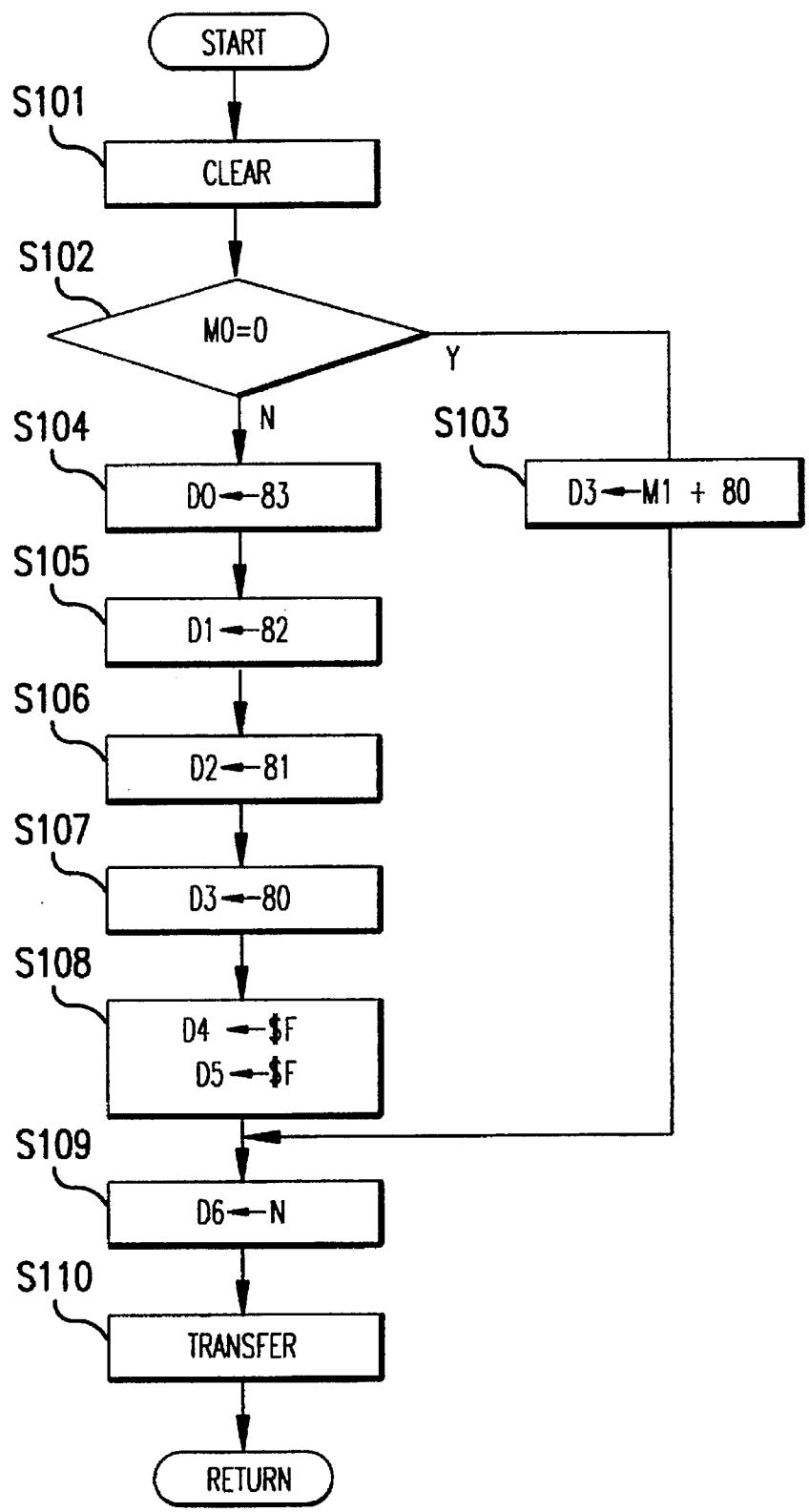
FIG. 8 is flow chart showing one of the examples of the setting process sub-routine being called at the display process of the main routine.
Figure 9:
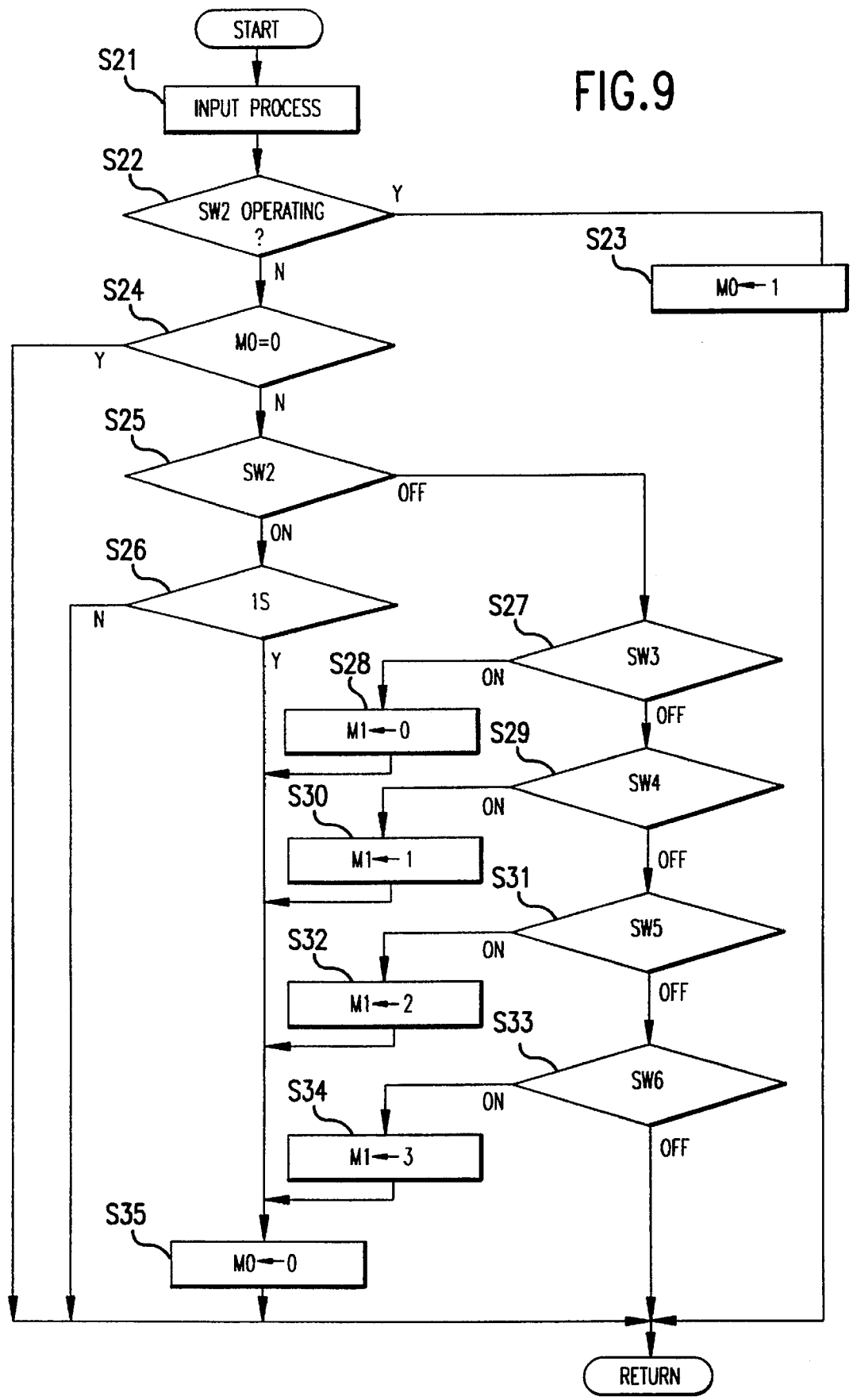
FIG. 9 is a flow chart showing another example of the sub-routine of the setting process described above.
Figure 10:
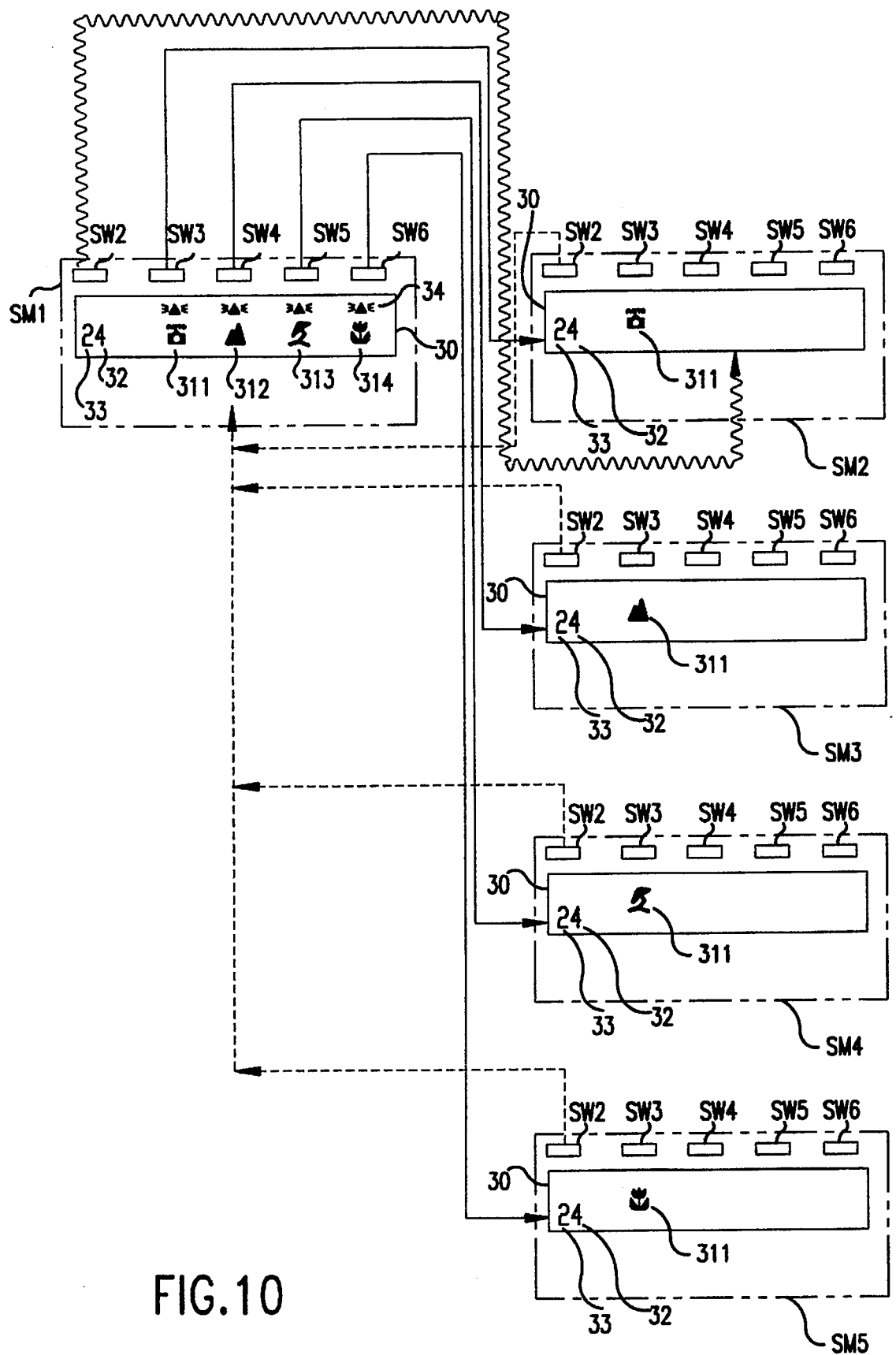
FIG. 10 is an explanatory diagram showing the corresponding relationship between the display and the operation of the camera in the embodiment according to this invention.

An operation of this embodiment is explained hereafter, with reference to the previously described figures, the flow charts in FIGS. 6 through 9, and the display shown in FIG. 10.

In this embodiment, control unit 10 accomplishes the menu display (the first display) process in order to select the parameter. The control unit 10 also executes process of selection in the further subordination hierarchy after being selected, the conclusive process of the selected branch being selected, the change of the input mode, and the skip process to the automatically jump to a specific mode. The corresponding relationship of the display and the switch operation in display panel 30 is shown in FIG. 10.

In FIG. 10, small rectangular shaped blocks shown at the upper section of display panel 30 are switches SW2 through SW6. The connecting lines indicate the selected moving location when switches SW2 through SW6 are ON in each state of display panel 30. The dotted line indicates the return to the first display state when switch SW2 is ON in each state of the second display of display panel 30. The wavy line indicates the moving location when switch SW2 is pushed for a certain period of time and when it is in the ON state.

In FIG. 10, SM1 indicates that the mode register M0 shown in Table 2 is "1". In other words, this indicates the first display mode. In this mode, each symbol of the camera icon and AUTO letters, the mountain icon, the profile icon and the flower icon, which are symbols in mode register M1 of the automatic mode P0, the scenery mode P1, the portrait mode P2 and the close up mode P3, respectively, is displayed in the order of display blocks 311 through 314. These are the possible modes that can be selected. To indicate that selection is possible, in this embodiment, a triangle segment flashes, which corresponds to auxiliary display section 34. In addition, in segment display sections 32 and 33, numerals with two digits are displayed, and the number of film pieces are indicated.

Each display screen SM2 through SM5 in FIG. 10, indicates the second display mode, which includes the selected results of the chosen mode corresponding to one of the display blocks in the first display. In other words, SM2 indicates the display screen of the automatic mode. SM3 indicates the display screen of the scenery mode. SM4 indicates the display screen of the portrait mode. SM5 indicates the display screen of the close up mode. In this state, the state register M0 is "0". When switch SW2 is pushed here, the second display mode is canceled and returns to the first display screen shown in SM1. In addition, in SM1 of FIG. 10, if switch SW2 is continuously pushed for a certain time (for example, 1 second), it moves into the automatic mode of SM2.

Figure 6:
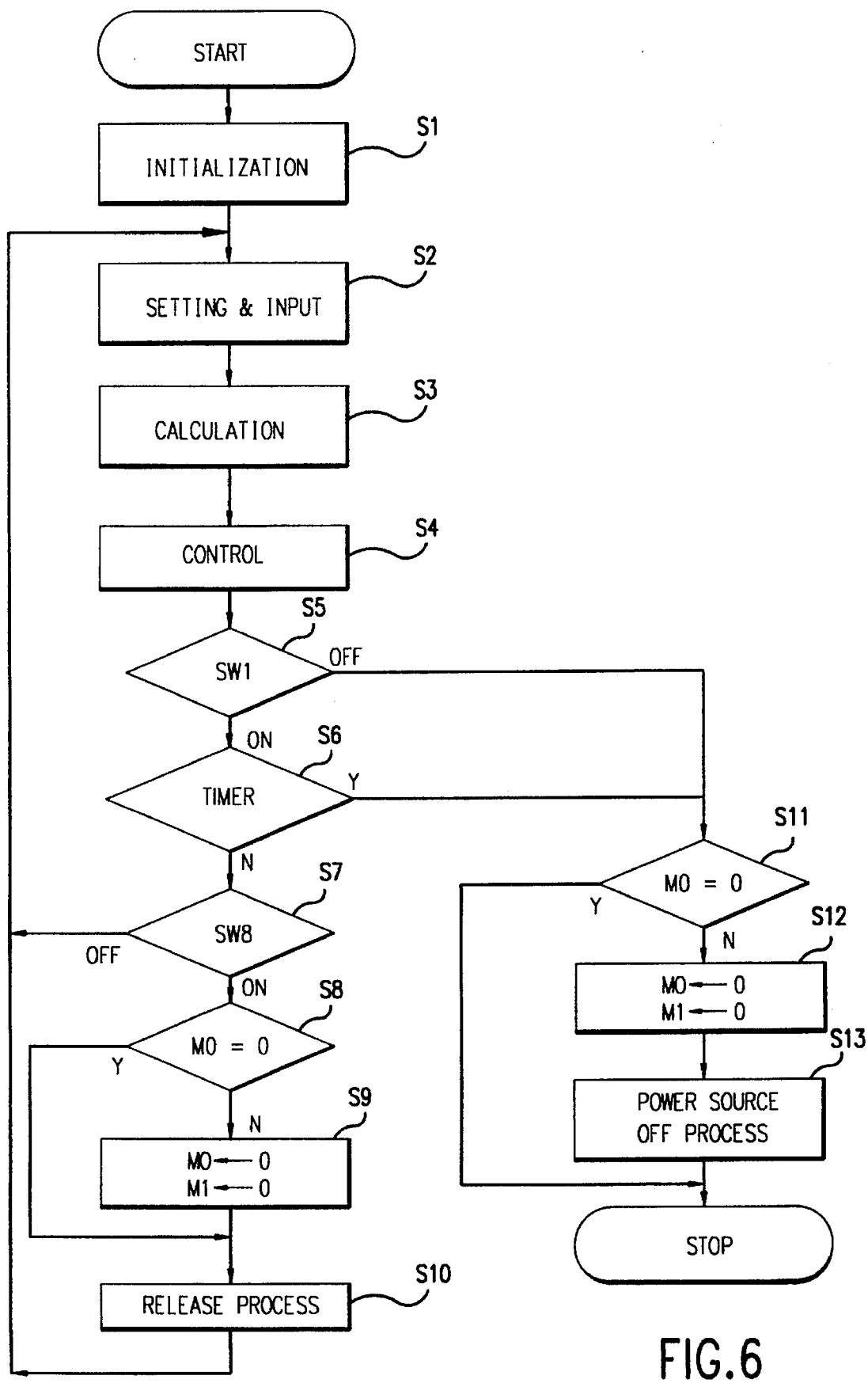
FIG. 6 is a flow chart showing one of the examples of the main routine of the control device in the embodiment according to the present invention.

FIG. 6 is a flow chart of the main routine executed by the control unit (MCU) 10. When either switch SW2 or switch SW7 is turned ON, an interrupt signal is input to MCU 10 while it is on stand-by (a condition in which only a minuscule amount of electric current is flowing), and the process in step 1 is started. In step 1, MCU 10 is initialized, power source circuit 11 is turned ON, and power is supplied to all circuits. In addition, clock circuit 104 in MCU 10 is started, and the main clock is turned on.

In step 2, a setting operation is conducted by determining the switch from which the signal was input into the MCU 10. In addition, the outputs of photometry circuit 12 and distance measurement circuit 13 are input into MCU 10 and stored in RAM 103 of MCU 10. With the present embodiment, a power source check is conducted at this step. If the results of the power source check indicate that the voltage is below a prescribed voltage, a warning is issued. This warning can, for example, be an error display on display panel 30 of the patterns in, e.g., the address DC and the address DD (i.e., "Err") of the characters shown in FIG. 11, and can include specifying the patterns for the addresses D6 and D7. In addition, depending upon the circumstances, shutter release can be prevented.

In step 3, exposure and distance measurement calculations are made in accordance with the condition of the data in RAM 103 obtained in step 2. With the present embodiment, when the output of photometry circuit 12 indicates low brightness in this step, a warning encouraging the use of, e.g., a strobe (not shown), can be issued.

In step 4, AF control (which controls first motor control means 17) and display control (which drives LCD driver 20) are executed. In step 5, a determination is made as to whether main switch SW1 is in the ON position. If main switch SW1 is on, MCU 10 advances to step 6; if the switch is off, MCU 10 advances to step 11.

In step 6, a determination is made as to whether the power source support timer exceeds a preset value. (The timer was cleared when the detection of the ON condition of switches SW2–SW7 was conducted in the setting input process in step 2.) If a switch has not operated, the power source support timer increases in value. When the timer exceeds the preset value, MCU 10 advances to step 11. On the other hand, when one of switches SW2–SW7 is operated and turned ON, the timer is cleared. Therefore, because the timer does not exceed the preset value, MCU 10 advances to step 7.

In step 7, a determination is made as to whether shutter release switch SW8 is ON. If shutter release switch SW8 is OFF, MCU 10 returns to step 2; if the switch is on, MCU 10 advances to step 8.

In step 8, MCU 10 determines whether the state register M0 is "0". If the register is 0, MCU 10 advances to step 10 because one of the modes has been selected. If register M0 is 1, however, MCU 10 advances to step 9 because the camera is in a state in which none of the modes have been selected.

In step 9, state register M0 is set to 0, indicating the non-selection state, and mode register M1 is set to 0 so as to set the automatic mode. In step 10, a well-known shutter release sequence is conducted by controlling second motor control circuit 18 and controlling exposure control circuit 19. After the shutter release sequence has been completed, MCU 10 returns to step 2 and repeats the processes described above. Accordingly, even when the shutter release sequence is entered with the selection state such that no mode has been selected, the camera is always controlled by the automatic mode.

On the other hand, when the main switch SW1 is OFF and the power source support timer exceeds a fixed value, MCU 10 moves to step 11. In step 11, a determination is made as to whether state register M0 is 0. If the register is 0, MCU 10 advances to step 13, but if the register is 1, MCU 10 advances to step 12.

In step 12, the state register M0 is set to 0, indicating the non-selection state, and mode register M1 is set to 0 so as to set the automatic mode. In step 13, power source circuit 11 is turned off, MCU 10 enters the standby mode, and this series of processes is concluded.

When main switch SW1 is turned OFF or when the timer exceeds a fixed time in the setting state, the state and mode are changed prior to the process of turning the power source OFF. As a result, the automatic mode is already set when the power source is next turned on.

Figure 7:
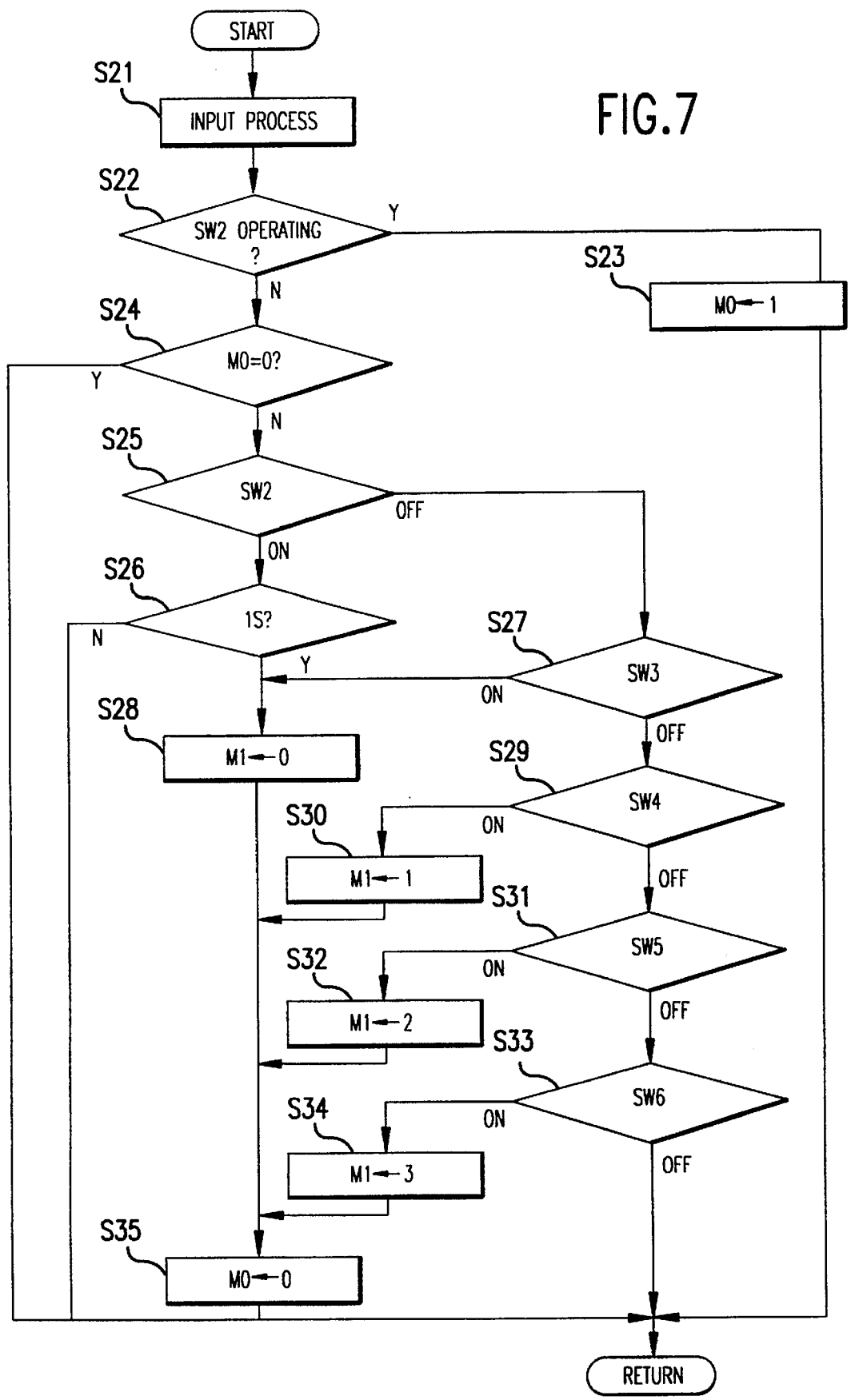
FIG. 7 is a flow chart showing one of the examples of the setting process sub-routine being called at the setting process of the main routine.

FIG. 7 shows part of the setting process routine, and is called as a subroutine during the process in step 2 of FIG. 6. In step 21, the input from switches SW2 to SW7 is received. If one of the switches is ON, the power source support timer that makes a determination in step 6 of FIG. 6 is cleared.

In step 22, a determination is made as to whether a decay in the signal from the switch SW2 is occurring. If the signal decays immediately after switch SW2 is turned ON, MCU 10 advances to step 23. If switch SW2 is OFF, or if switch SW2 is ON but is still being pressed, MCU 10 advances to step 24. In step 23, the state register M0 is set to 1, and MCU 10 returns with this value as the selection state.

In step 24, a determination is made as to whether state register M0 is 0. When state register is 0, MCU 10 returns, but if a selection state exists and M0=1, MCU 10 advances to step 25.

In step 25, a determination is made as to whether switch SW2 is ON or OFF. If switch SW2 is ON, MCU 10 advances to step 26; if switch SW2 is OFF, MCU 10 advances to step 27.

In step 26, a determination is made as to whether at least one second has elapsed. If switch SW2 has been depressed for at least one second, MCU 10 advances to step 28; if not, MCU 10 returns.

In step 27, a determination is made as to whether switch SW3 is ON or OFF. If switch SW3 is ON, MCU 10 advances to step 28; if switch SW3 is OFF, MCU 10 advances to step 29. In step 28, mode register M1 is set to the automatic mode as 0, and MCU 10 then advances to step 35.

In step 29, a determination is made as to whether switch SW4 is ON or OFF. If switch SW4 is on, MCU 10 advances to step 30. If switch SW4 is off, MCU 10 advances to step 31. In step 30, mode register M1 is set to the scenery mode as 1, and MCU 10 then advances to step 35.

In step 31, a determination is made as to whether switch SW5 is ON or OFF. If switch SW5 is ON, MCU 10 advances to step 32. If switch SW5 is OFF, MCU 10 advances to step 33. In step 32, mode register M1 is set to the portrait mode as 2, and MCU 10 then advances to step 35.

In step 33, a determination is made as to the switch SW6 is ON or OFF. If switch SW6 is ON, MCU 10 advances to step 34. If switch SW6 is OFF, MCU 10 returns. In step 34, mode register M1 is set to the close-up mode as 3, and MCU 10 then advances to step 35. In step 35, state register M0 is set to 0, and MCU 10 then returns.

Accordingly, switches SW3 to SW6 are effective only while the camera is in the selection state. Delay of the signal from switch SW2, however, is always effective to change to the selection state from the non-selection state, and to change from the non-selection state to the selection state after setting the automatic mode by switch SW2 being depressed for at least one second in the selection state.

FIG. 8 is a flow chart of the display routine. This process is called as a subroutine and executed during control in step 4 of FIG. 6. In the example below, the command is transferred by the method described in connection with Tables 5 and 6. Providing displays by using the commands shown in Table 4 and by reading the character patterns shown in FIG. 11 is also possible.

In this case, addresses indicating the display data are transferred in en-size units instead of em-size units. In step 101, D0–D6, in the regions of RAM 103 where the commands transferred to LCD driver 20 are stored, are cleared. In step 102, a determination is made as to whether state register M0 is set to 0. When state register M0 is set to 0, indicating a non-selection state, MCU 10 advances to step 103. If state register M0 is 1, indicating a selection state, MCU 10 moves to step 104.

In step 103, a value equal to adding 80 to the contents of mode register M1 is stored in D3. At this time, because 80 is stored in D3 if mode register M1 is 0, the automatic mode is enabled in the far left component (i.e., the display block 311) of dot matrix display component 310. Similarly, because 81 is stored in D3 if mode register M1 is 1, the scenery mode is enabled in the far left component of dot matrix display component 310. Likewise, because 82 is stored in D3 if mode register M1 is 2, the portrait mode is enabled in the far left component of dot matrix display component 310. In addition, because 83 is stored in D3 if mode register M1 is 3, the close-up mode is enabled, also in the far left component of dot matrix display component 310.

In step 104, 83 is stored in D0, and the close-up mode is enabled in the far right component (display block 314) of dot matrix display component 310. In step 105, 82 is stored in D1, and the portrait mode is enabled in the center-right component (display block 313). In step 106, 81 is stored in D2, and the scenery mode is enabled in the center-left component (display block 312). In step 107, 80 is stored in D3, and the automatic mode is enabled in the far left component (display block 311). In step 108, $F is stored in each of D4 and D5 such that the four triangle segments (black triangle displays) 34a, 34c, 34d and 34f in auxiliary display component 34 corresponding to each display block 311–314 of dot matrix display component 310 are enabled to flash. In step 109, a frame number display is enabled with the seven segment displays corresponding to film frame number N by storing film frame number N in D6.

In step 110, the commands set in D0 to D6 are transferred to driver 20. In driver 20, the display patterns corresponding to these set commands are read, and LCD displays are enabled in display panel 30.

Another example of the processes of the present invention is described with reference to FIG. 9. FIG. 9 is a variation of the flow chart in FIG. 7. The difference between FIG. 9 and FIG. 7 is the destination to which the MCU 10 jumps from step 26. In FIG. 7, when switch SW2 is depressed and at least one second elapses, MCU 10 advances to step 28 and then advances to step 35. In FIG. 9, however, MCU 10 advances directly to step 35, skipping the process in step 28.

In other words, with the routine as shown in FIG. 7, when switch SW2 is continuously depressed for at least one second, the camera enters a non-selection state after always being reset to the automatic mode. However, as shown in FIG. 9, the mode register is not overwritten, and because of this the camera returns to the last selected mode and then enters the non-selection state. In other words, the mode selected immediately before is input as the parameter.

With the embodiments described above, a liquid crystal display is preferably used as the dot matrix display component, but this is intended to be illustrative and not limiting. Accordingly, the display element can be any device that is capable of providing a dot matrix display.

In addition, with the described embodiments, four display blocks 311–314 are positioned in the display panel 30. In the first display, symbols expressing each of the modes are displayed in a row. Accordingly, because the selection choices are arranged in a single row, a novice can easily recognize the selection choices. In addition, because switches SW3–SW6 are arranged in correspondence with display blocks 311–314, the photographer can ascertain the particular switch that must be actuated to activate the desired selection sequence, even if the photographer is unfamiliar with that particular sequence. Moreover, because character patterns are displayed in easily discernible dot displays, the photographer can immediately determine the contents of each character pattern.

In the first display, mode selection is confirmed by selecting one of switches SW3–SW6. In other words, camera parameters are input into the camera by selecting one of the items out of the selection choices. When an item is selected, the display shifts to a second display. This second display displays only the symbol for the selected mode. Accordingly, it is possible for the photographer to verify the selected state with certainty. Moreover, the photographer can return to the first display from the second display by pressing the switch SW2. As a result, the photographer can always easily return the display to the original display.

Furthermore, by continuously depressing switch SW2 for a fixed time, the photographer can change to the automatic mode. It would also be appropriate for the camera to change to a predetermined mode. In this case, a special mode register is separately provided and when, e.g., switch SW2 is depressed for longer than this fixed time, a mode would be selected in accordance with the contents of this special register instead of the normal mode register.

When a shutter release opportunity (i.e., the chance to take a photograph) arises, photography is possible in at least the automatic mode even when mode selection has not been completed. Accordingly, missed opportunities for photographs can be prevented.

With the present invention, the operation switches and the display correspond with each other so that even a novice can readily understand how to use them. In addition, because the display is large and easy to read, an unfamiliar photographer can readily read information relating to parameters. Moreover, these parameters can be set with ease.

What is claimed is:

1. A camera comprising:

a memory that stores a plurality of preset parameters used to control the camera during a photographic operation;

a display component coupled to the memory that displays a selection of parameters from the plurality of stored parameters;

a selector coupled to the display component that allows a user to select at least one of the displayed parameters in a user parameter selection sequence;

a controller programmed to automatically select a parameter that controls the photographic operation when an interruption in the user parameter selection sequence occurs, wherein when the selector is operated the parameter is selected using the display component;

a shutter assembly coupled to the controller that executes the photographic operation based on the selected parameter; and whereby any parameter selected by the user prior to an interruption of the user parameter selection sequence is maintained and used to control the photographic operation.

2. The camera of claim 1, wherein the controller selects a preprogrammed parameter that sets focus and exposure settings.

3. The camera of claim 1, further comprising a power switch coupled to the controller, wherein when the power switch is operated, the interruption in the user parameter selection sequence occurs and the parameter is automatically selected by the controller.

4. The camera of claim 3, wherein when the power switch is switched OFF, the interruption in the user parameter selection sequence occurs and the parameter is automatically selected by the controller.

5. The camera of claim 1, wherein the shutter assembly includes a shutter release, and wherein when the shutter release is actuated, the interruption in the user parameter selection sequence occurs and the parameter is automatically selected by the controller.

6. The camera of claim 1, wherein the controller further includes a timer, and wherein when the timer exceeds a predetermined value, the interruption in the user parameter selection sequence occurs and the parameter is automatically selected by the controller.

7. The camera of claim 1, wherein the display component includes a dot matrix display having a plurality of display blocks and the selector includes a plurality of switches, each of the switches being positioned to correspond to one of the display blocks.

8. The camera of claim 1, wherein the display component displays at least a first display in which the plurality of preset parameters available for selection are displayed and at least a second display in which the selected parameter is displayed.

9. A method of continuing a photographic operation with a camera after an interruption in a user parameter selection sequence has occurred, the camera having a controller that controls the photographic operation of the camera and is coupled to a memory, a display component and a shutter assembly that executes the photographic operation, the method comprising the steps of:

storing a plurality of preset parameters used to control the camera during the photographic operation;

displaying at least one of the stored parameters for selection;

receiving user input through the shutter assembly to initiate the photographic operation, wherein an interruption occurs in the user parameter selection sequence before a particular parameter is selected by the user;

automatically designating the particular parameter with the controller; and continuing the photographic operation in accordance with the particular parameter automatically designated by the controller, whereby any parameter received from the user prior to the interruption in the user parameter selection sequence is maintained and used to control the photographic operation.

10. The method of claim 9, wherein the camera includes a power switch, and wherein the interruption occurs when the power switch is operated.

11. The method of claim 10, wherein the interruption occurs when the power switch is switched OFF.

12. The method of claim 9, wherein the camera includes a shutter release coupled to the shutter assembly, and wherein the interruption occurs when the shutter release is being actuated.

13. The method of claim 9, wherein the controller further includes a timer, and wherein the interruption occurs when the timer exceeds a predetermined value.

14. The method camera of claim 9, wherein the display component includes a dot matrix display having a plurality of display blocks and the shutter assembly includes a plurality of switches, each of the switches corresponding to one of the display blocks.

15. The method of claim 9, wherein the display component displays at least a first display in which the plurality of preset parameters available for selection are displayed and at least a second display in which the selected parameter is displayed.

16. A camera comprising:
memory means for storing a plurality of preset parameters used to control the camera during a photographic operation;
display means for displaying parameters stored in the memory means, the display means being coupled to the memory means;
selector means for selecting at least one of the displayed parameters for the photographic operation, the selector means being coupled to the display means;
control means for controlling the photographic operation of the camera by automatically selecting a parameter to control the photographic operation of the camera when an interruption in a user parameter selection sequence occurs, wherein when the selector means is operated by the user the parameter is selected using the display means, whereby the camera permits a photographer to continue a photographic operation executed after an interruption in a user parameter selection sequence based on the parameter automatically selected by the control means and any parameter selected by the user prior to the interruption in the user parameter selection sequence.

* * * * *